United States Patent
Kim et al.

(10) Patent No.: US 11,375,375 B2
(45) Date of Patent: Jun. 28, 2022

(54) METHOD FOR TRANSMITTING AND RECEIVING CONTROL MESSAGE IN COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventors: Hyung Sub Kim, Daejeon (KR); Jae Heung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 323 days.

(21) Appl. No.: 16/681,865

(22) Filed: Nov. 13, 2019

(65) Prior Publication Data

US 2020/0162920 A1    May 21, 2020

(30) Foreign Application Priority Data

Nov. 21, 2018   (KR) .................. 10-2018-0144195

(51) Int. Cl.
*H04W 12/106*   (2021.01)
*H04W 76/12*   (2018.01)
(Continued)

(52) U.S. Cl.
CPC ............ *H04W 12/106* (2021.01); *H04W 8/24* (2013.01); *H04W 76/11* (2018.02); *H04W 76/12* (2018.02); *H04W 76/27* (2018.02)

(58) Field of Classification Search
CPC ...... H04W 12/106; H04W 8/24; H04W 76/11; H04W 76/12; H04W 76/27; H04W 12/00;
(Continued)

(56) References Cited

U.S. PATENT DOCUMENTS 9,942,926 B2   4/2018   Ejzak et al.
10,080,109 B2   9/2018   Yu et al.
(Continued)

FOREIGN PATENT DOCUMENTS

| KR | 10-2018-0011450 A | 2/2018 |
| KR | 10-2018-0115626 A | 10/2018 |
| WO | 2017/119723 A1 | 7/2017 |

OTHER PUBLICATIONS

"3rd Generation Partnership Project;Technical Specification Group Radio Access Network; NR; Radio Resource Control (RRC) protocol specification (Release 15)", 3GPP TS 38.331 V15.1.0 (Mar. 2018).

(Continued)

*Primary Examiner* — Andrew Wendell
(74) *Attorney, Agent, or Firm* — LRK Patent Law Firm

(57) ABSTRACT

An operation method of a UE in a communication system includes receiving, from a base station, a security mode command message including information requesting reporting of capability information and security configuration information; identifying the security configuration information included in the security mode command message; and transmitting, to the base station, a security mode complete message including the capability information requested by the security mode command message.

9 Claims, 6 Drawing Sheets

(51) Int. Cl.
*H04W 8/24* (2009.01)
*H04W 76/11* (2018.01)
*H04W 76/27* (2018.01)

(58) Field of Classification Search
CPC ... H04W 74/002; H04W 8/22; H04W 88/023; H04L 29/06537; H04L 51/06; H04L 69/24
See application file for complete search history.

(56) References Cited

U.S. PATENT DOCUMENTS

| | | | |
|---|---|---|---|
| 10,512,030 | B2 | 12/2019 | Byun et al. |
| 10,813,028 | B2 | 10/2020 | Hong et al. |
| 2010/0150049 | A1 | 6/2010 | Kim et al. |
| 2015/0264637 | A1 | 9/2015 | Zaus et al. |
| 2016/0183230 | A1 | 6/2016 | Park et al. |
| 2017/0006469 | A1* | 1/2017 | Palanigounder ........ H04L 9/085 |
| 2017/0325283 | A1* | 11/2017 | Wu ........................ H04W 76/27 |
| 2018/0062847 | A1 | 3/2018 | Mildh et al. |
| 2018/0146365 | A1* | 5/2018 | Dhanapal ............... H04W 8/183 |
| 2018/0324594 | A1* | 11/2018 | Chen ...................... H04W 12/06 |
| 2019/0059119 | A1* | 2/2019 | Hapsari ................. H04W 76/10 |
| 2019/0141081 | A1* | 5/2019 | Kunz ...................... H04L 63/20 |
| 2019/0149326 | A1* | 5/2019 | Li .......................... H04L 9/0844 |
| | | | 713/181 |
| 2020/0145967 | A1* | 5/2020 | Park .................... H04W 72/0426 |

OTHER PUBLICATIONS

"3rd Generation Partnership Project; Technical Specification Group Radio Access Network; NG-RAN; Architecture description (Release 15)", 3GPP TS 38.401 V15.2.0 (Jun. 2018).

"3rd Generation Partnership Project; Technical Specification Group Radio Access Network; NG-RAN; E1 Application Protocol (E1AP) (Release 15)", 3GPP TS 38.463 V15.0.0 (Jun. 2018).

"3rd Generation Partnership Project; Technical Specification Group Radio Access Network; NG-RAN; F1 application protocol (F1AP) (Release 15)", 3GPP TS 38.473 V15.0.0 (Dec. 2017).

Ericsson, "Introduction of SA", 3GPP TSG-WG2 Meeting #102AH, R2-1810388, Montreal, Canada, Jul. 2-6, 2018.

3GPP, "3rd Generation Partnership Project; Technical Specification Group Radio Access Network; NG-RAN; Architecture description (Release 15)", 3GPP TS 38.401 V15.3.0 (Sep. 2018).

* cited by examiner

METHOD FOR TRANSMITTING AND RECEIVING CONTROL MESSAGE IN COMMUNICATION SYSTEM AND APPARATUS FOR THE SAME

CROSS-REFERENCE TO RELATED APPLICATION

This application claims priority to Korean Patent Application No. 10-2018-0144195 filed on Nov. 21, 2018 in the Korean Intellectual Property Office (KIPO), the entire content of which is hereby incorporated by reference.

BACKGROUND

1. Technical Field

The present disclosure relates to a technique for transmitting and receiving a control message, and more particularly, to a method and an apparatus for simplifying a transmission and reception procedure of control messages in a communication system.

2. Description of Related Art

A communication system may include a core network (e.g., a mobility management entity (MME), a serving gateway (SGW), a packet data network (PDN) gateway (PGW), and the like), a base station, a small base station, a relay, a user equipment (UE), and the like. The communication between the base station and the UE may be performed using various radio access technologies (e.g., 4G communication technology, 5G communication technology, WiMax technology, wireless local area network (WLAN) technology, wireless personal area network (WPAN) technology, and the like).

Control messages (e.g., higher layer messages or radio resource control (RRC) messages) may be transmitted and received for link establishment and connection setup between the base station and the UE. There has been a problem that overhead is increased due to the transmission and reception procedure of the control messages in the existing communication system and the communication between the base station and the UE is delayed. In order to solve these problems, a method for simplifying the transmission and reception procedure of the control messages will be needed.

SUMMARY

In order to solve the above-described problem, embodiments of the present disclosure provide an apparatus and a method for simplifying a transmission and reception procedure of control messages in a communication system.

In order to achieve the objective of the present disclosure, an operation method of a user equipment (UE) in a communication system may comprise receiving, from a base station, a security mode command message including information requesting reporting of capability information and security configuration information; identifying the security configuration information included in the security mode command message; and transmitting, to the base station, a security mode complete message including the capability information requested by the security mode command message.

Each of the security mode command message and the security mode complete message may be a radio resource control (RRC) message.

The security configuration information may indicate a ciphering algorithm and an integrity protection algorithm used in communication between the UE and the base station.

The security mode command message may request reporting of capability information for one or more radio access technologies (RATs), and the security mode complete message may include the capability information for the one or more RATs.

The operation method may further comprise performing communication with the base station based on the security configuration information.

Furthermore, in order to achieve the objective of the present disclosure, an operation method of a base station in a communication system may comprise transmitting, to a user equipment (UE), a security mode command message including information requesting reporting of capability information and security configuration information; and receiving, from the UE, a security mode complete message including the capability information requested by the security mode command message.

Each of the security mode command message and the security mode complete message may be a radio resource control (RRC) message.

The security configuration information may indicate a ciphering algorithm and an integrity protection algorithm used in communication between the UE and the base station.

The security mode command message may request reporting of capability information for one or more radio access technologies (RATs), and the security mode complete message may include the capability information for the one or more RATs.

The operation method may further comprise establishing a bearer for the UE, wherein when the base station includes a first node performing a control plane (NB-CU-CP) function, a second node performing a user plane (NB-CU-UP) function, and a third node performing a NB-DU function, in the establishing of the bearer, the third node may transmit to the first node a first message including general packet radio service (GPRS) tunneling protocol (GTP) tunnel information.

The GTP tunnel information may include a tunnel endpoint identifier (TEID) and an internet protocol (IP) address for the third node.

The first message may be an F1 setup request message or a GNB-DU configuration update message.

The communication between the first node and the second node may be performed using a control message according to an E1 application protocol (E1AP), the communication between the first node and the third node may be performed using a control message according to an F1 application protocol (F1AP), and the communication between the second node and the third node may be performed using a control message according to the F1AP.

The establishing of the bearer may further comprise transmitting, by the first node, a bearer context setup request message including the GTP tunnel information to the second node.

The establishing of the bearer may further comprise transmitting, by the first node, a UE context setup request message including the GTP tunnel information to the third node through the second node.

Furthermore, in order to achieve the objective of the present disclosure, a user equipment (UE) in a communication system may be configured to comprise a processor and a memory storing at least one instruction executable by the processor. Also, when executed by the processor, the at least one instruction may be configured to receive, from a base station, a security mode command message including information requesting reporting of capability information and security configuration information; identify the security configuration information included in the security mode command message; and transmit, to the base station, a security mode complete message including the capability information requested by the security mode command message.

Each of the security mode command message and the security mode complete message may be a radio resource control (RRC) message.

The security configuration information may indicate a ciphering algorithm and an integrity protection algorithm used in communication between the UE and the base station.

The security mode command message may request reporting of capability information for one or more radio access technologies (RATs), and the security mode complete message may include the capability information for the one or more RATs.

According to the embodiments of the present disclosure, the transmission and reception procedure of the security configuration information and the transmission and reception procedure of the UE capability information can be performed in a single procedure. The NB-DU can also transmit GTP tunnel information to the NB-CU-CP through an F1 setup request message or a GNB-DU configuration update message. The NB-CU-CP can obtain the GTP tunnel information from the NB-DU, and can transmit the GTP tunnel information to the NB-CU-UP through a bearer context setup request message or a UE context setup request message. In this case, the transmission and reception procedure of a bearer context modification request/response message for notifying the GTP tunnel information to the NB-CU-UP may be omitted. Therefore, the communication delay between the base station and the UE can be reduced, and the performance of the communication system can be improved.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
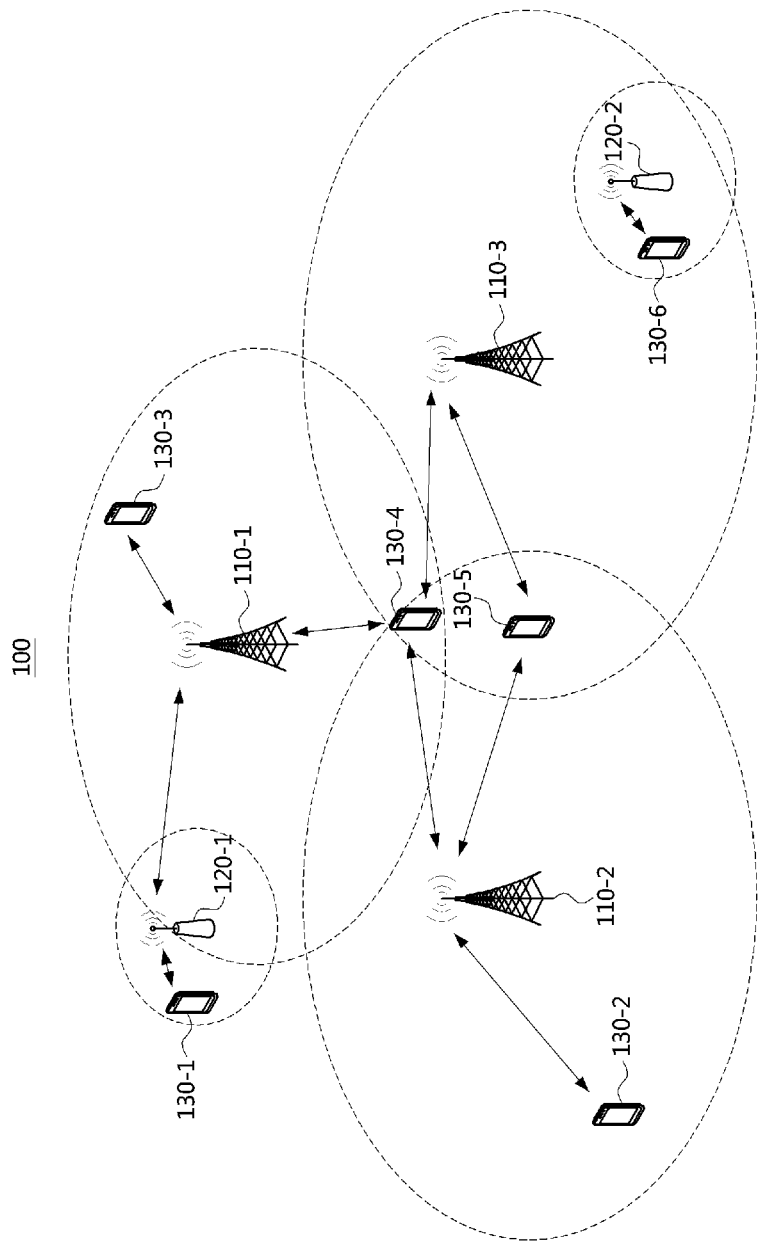
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments according to the present disclosure are applied will be described. However, the communication systems to which embodiments according to the present disclosure are applied are not restricted to what will be described below. That is, the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE), LTE-advanced (LTE-A)), 5G communication (e.g., new radio (NR)), or the like. The 4G communication may be performed in a frequency band below 6 GHz, and the 5G communication may be performed in a frequency band above 6 GHz as well as the frequency band below 6 GHz.

For example, for the 4G communication and the 5G communication, the plurality of communication nodes may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like.

Also, the communication system 100 may further comprise a core network. When the communication system supports the 4G communication, the core network may include a serving gateway (S-GW), a packet data network (PDN) gateway (P-GW), a mobility management entity (MME), and the like. When the communication system 100 supports the 5G communication, the core network may include an access and mobility management function (AMF), a user plane function (UPF), a session management function (SMF), and the like.

Meanwhile each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
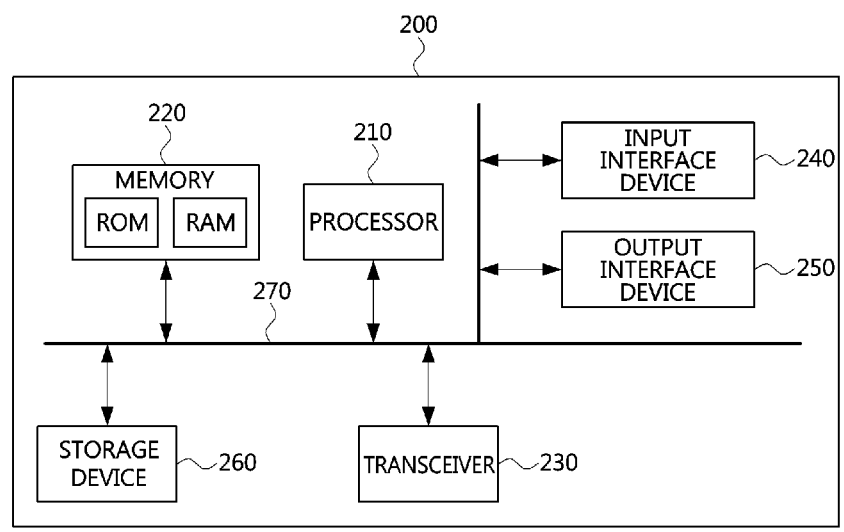
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Next, methods for transmitting and receiving control messages in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 3:
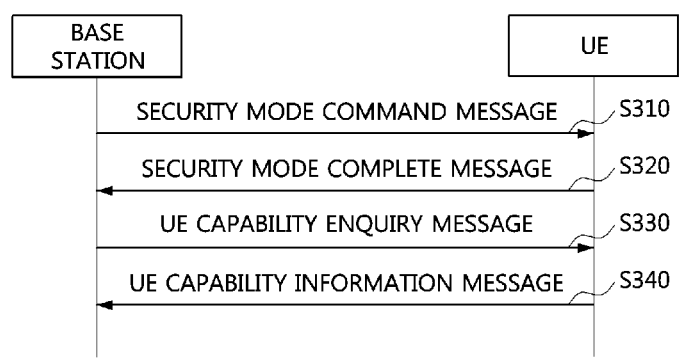
FIG. 3 is a sequence chart illustrating a first embodiment of a method for security configuration and UE capability identification in a communication system.

FIG. 3 is a sequence chart illustrating a first embodiment of a method for security configuration and UE capability identification in a communication system.

Referring to FIG. 3, a communication system may include a base station and a UE. The base station may be the base station 110-1, 110-2, 110-3, 120-1, or 120-2 shown in FIG. 1, and the UE may be the UE 130-1, 130-2, 130-3, 130-4, 130-5, or 130-6 shown in FIG. 1. The base station and the UE may be configured to be the same as or similar to the communication node 200 shown in FIG. 2.

In an access procedure between the base station and the UE, a security configuration procedure and a UE capability identification procedure may be performed. The base station may initiate the security configuration procedure and the UE capability identification procedure when a specific message is received from a communication node belonging to a core network. When the communication node belonging to the core network has the capability information of the UE, the UE capability identification procedure may not be performed.

In the security configuration procedure, the base station may inform the UE of a ciphering algorithm and an integrity protection algorithm used in the communication between the base station and the UE. For example, the base station may generate a security mode command message. The security mode command message may include security configuration information, and the security configuration information may include information elements defined in Table 1 below.

TABLE 1

| Information element | Description |
| --- | --- |
| Ciphering algorithm | Algorithm used for ciphering |
| integrity protection algorithm | Algorithm used for integrity protection |

The base station may transmit the security mode command message to the UE (S310). The security mode command message may be a higher layer message (e.g., radio resource control (RRC) message). The UE may receive the security mode command message from the base station, and may identify the information elements included in the security mode command message. For example, the UE may identify the ciphering algorithm and the integrity protection algorithm used for the communication between the base station and the UE.

When the security mode command message has been successfully received, the UE may generate a security mode complete message in response to the security mode command message. The security mode complete message may indicate that the configuration based on the information elements included in the security mode command message has been completed. The UE may transmit the security mode complete message to the base station (S320). The security mode complete message may be a higher layer message (e.g., RRC message). When the security mode complete message is received from the UE, the base station may determine that the configuration based on the information elements included in the security mode command message has been completed in the UE.

Meanwhile, in the UE capability identification procedure, the base station may request the UE to report capability information, and obtain the capability information from the UE. The base station may request the UE to report the capability information in order to derive optimal radio configuration or determine services (e.g., carrier aggregation (CA), dual connectivity (DC)) that can be supported for the UE.

For example, the base station may generate a UE capability enquiry message to identify the capability information of the UE. The UE capability enquiry message may include UE capability request information, and the UE capability request information may include information elements described in Table 2 below.

TABLE 2

| Information element | Description |
| --- | --- |
| RAT1 | Request for UE capability information for RAT1 |
| RAT2 | Request for UE capability information for RAT2 |

For example, the UE capability enquiry message may request reporting of UE capability information for one or more radio access technologies (RATs). The base station may transmit the UE capability enquiry message to the UE (S330). The UE capability enquiry message may be a higher layer message (e.g., RRC message). The UE may receive the UE capability enquiry message from the base station, and identify the capability information requested by the UE capability enquiry message. For example, when the UE capability information included in the UE capacity enquiry message indicates the information elements described in Table 2, the UE may determine that reporting of capability information for RAT1 and RAT2 is requested.

In this case, the UE may generate a UE capability information message including the capability information for RAT1 and RAT2. The UE capability information message may include UE capability response information, and the UE capability response information may include information elements described in Table 3 below.

TABLE 3

| Information element | Description |
|---|---|
| RAT1 | UE capability information for RAT1 |
| RAT2 | UE capability information for RAT2 |

The UE may transmit the UE capability information message to the base station (S340). The UE capability information message may be a higher layer message (e.g., RRC message). The base station may receive the UE capability information message from the UE, and may identify the capability information of the UE included in the UE capability information message.

When the security configuration procedure and the UE capability identification procedure are completed (or, the security configuration procedure is completed), a bearer establishment procedure between the base station and the UE may be performed. Also, the base station may provide a specific communication service to the UE according to the capability information of the UE.

According to the above-described embodiments, since the security configuration procedure and the UE capability identification procedure are respectively performed, a communication delay between the base station and the UE may occur. Therefore, it will be necessary to reduce the communication delay between the base station and the UE.

Figure 4:
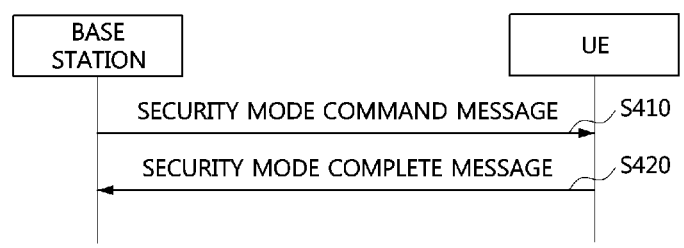
FIG. 4 is a sequence chart illustrating a second embodiment of a method for security configuration and UE capability identification in a communication system.

FIG. 4 is a sequence chart illustrating a second embodiment of a method for security configuration and UE capability identification in a communication system.

Referring to FIG. 4, a communication system may include a base station and a UE. The base station may be the base station 110-1, 110-2, 110-3, 120-1, or 120-2 shown in FIG. 1, and the UE may be the UE 130-1, 130-2, 130-3, 130-4, 130-5, or 130-6 shown in FIG. 1. The base station and the UE may be configured to be the same as or similar to the communication node 200 shown in FIG. 2.

The base station may perform an operation of providing the security configuration information and an operation of requesting the UE capability information using a single higher layer message. For example, the base station may generate a security mode command message that includes the security configuration information and UE capability enquiry information. The security mode command message may include information elements described in Table 4 below.

TABLE 4

| | Information element | Description |
|---|---|---|
| Security configuration information | Ciphering algorithm | Algorithm used for ciphering |
| | integrity protection algorithm | Algorithm used for integrity protection |
| UE capability enquiry | RAT1 | UE capability information for RAT1 |
| | RAT2 | UE capability information for RAT2 |

When the core network already has the capability information of the UE, the security mode command message may only include the security configuration information. On the other hand, when the core network does not know the capability information of the UE, the security mode command message may include the UE capability enquiry information as well as the security configuration information.

The base station may transmit the security mode command message to the UE (S410). The security mode command message may be a higher layer message (e.g., RRC message). The UE may receive the security mode command message from the base station, and may identify the information elements included in the security mode command message. For example, the UE may identify the ciphering algorithm and the integrity protection algorithm used for the communication between the base station and the UE. Also, when the security mode command message includes the UE capability enquiry information, the UE may identify the capability information to be reported to the base station.

When the security mode command message includes only the security configuration information, the UE may generate a security mode complete message indicating that the configuration based on the information elements included in the security mode command message has been completed. Alternatively, when the security mode command message includes the UE capability enquiry information as well as the security configuration information, the UE may generate the security mode complete message including capability response information. For example, the security mode complete message may include information elements described in Table 5 below. Also, the security mode complete message may indicate that the configuration based on the security configuration information included in the security mode command message has been completed.

TABLE 5

| | Information element | Description |
|---|---|---|
| UE capability response | RAT1 | UE capability information for RAT1 |
| | RAT2 | UE capability information for RAT2 |

The UE may transmit the security mode complete message to the base station (S420). The base station may receive the security mode complete message from the UE, and may identify the information elements included in the security mode complete message. For example, the base station may determine that the configuration based on the security configuration information included in the security mode command message has been completed in the UE when the security mode complete message is received. When the security mode complete message includes the UE capability response information, the base station may identify the capability information of the UE based on the UE capability response information. After the step S420 is completed, a bearer establishment procedure between the UE and the base station may be performed.

Meanwhile, a functional split may be applied to a communication system. When the functional split is applied, functions of layers implemented in one existing physical apparatus may be implemented in different physical apparatuses. For example, a plurality of layers according to a protocol stack in a base station may be configured as follows.

Figure 5:
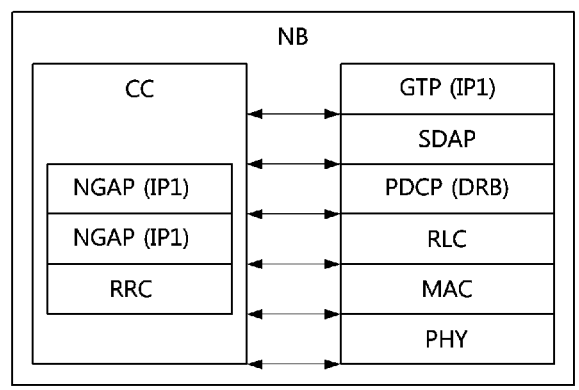
FIG. 5 is a block diagram illustrating a first embodiment of a protocol stack of a base station in a communication system.

FIG. 5 is a block diagram illustrating a first embodiment of a protocol stack of a base station in a communication system.

Referring to FIG. 5, a base station NB may be the base station 110-1, 110-2, 110-3, 120-1, or 120-2 shown in FIG. 1, and may be configured to be the same as or similar to the communication node 200 shown in FIG. 2. The base station NB may include a control control (CC) plane, and the CC plane may include a new generation application protocol (NGAP) layer and an RRC layer. The base station NB may include layers corresponding to the CC plane. For example, the base station NB may include a general packet radio service (GPRS) tunneling protocol (GTP) layer, a service data application protocol (SDAP) layer, a packet data convergence protocol (PDCP) layer, a radio link control (RLC) layer, a medium access control (MAC) layer, and a physical (PHY) layer.

The functional split according to a F1 application protocol (F1AP) may be applied to the protocol stack shown in FIG. 5. The protocol stack to which the functional split according to the F1AP is applied may be as follows.

Figure 6:
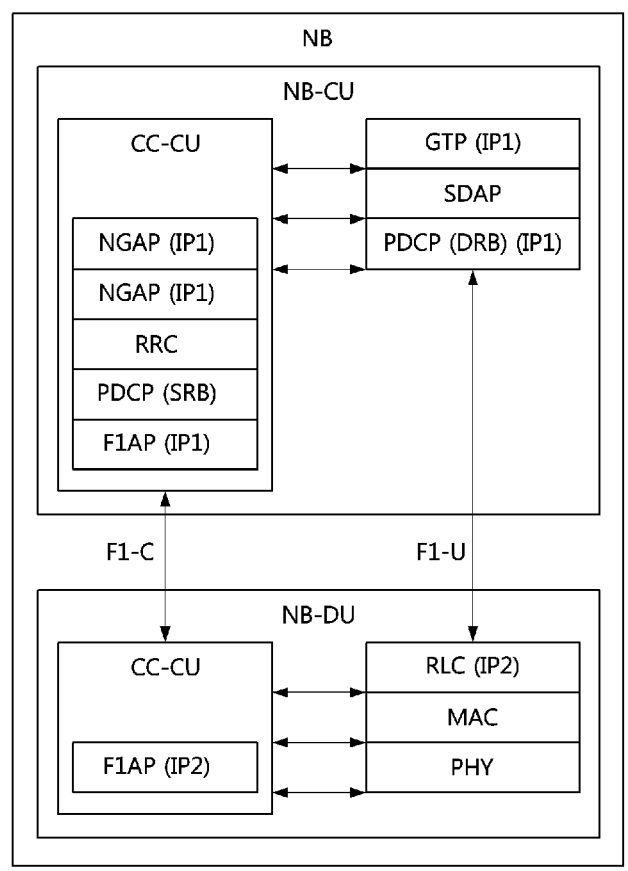
FIG. 6 is a block diagram illustrating a second embodiment of a protocol stack of a base station in a communication system.

FIG. 6 is a block diagram illustrating a second embodiment of a protocol stack of a base station in a communication system.

Referring to FIG. 6, a base station NB may be the base station 110-1, 110-2, 110-3, 120-1, or 120-2 shown in FIG. 1, and may be configured to be the same as or similar to the communication node 200 shown in FIG. 2. The base station NB may include an NB-CU plane and an NB-DU plane. That is, when the functional split according to the F1AP is applied to the protocol stack, the layers constituting the base station NB may be split into the NB-CU plane and the NB-DU plane.

The NB-CU plane may include a CC-CU plane and layers corresponding to the CC-CU plane. For example, the CC-CU plane may include a NGAP layer, an RRC layer, a PDCP layer, and an F1AP layer. The PDCP layer included in the CC-CU plane may provide signaling radio bearer (SRB) related functions. Also, the NB-CU plane may further include a GTP layer, an SDAP layer, and a PDCP layer. The PDCP layer corresponding to the CC-CU plane in the NB-CU plane may provide data radio bearer (DRB) related functions.

The NB-DU plane may include a CC-DU plane and layers corresponding to the CC-DU plane. The CC-DU plane may include an F1AP layer. Also, the NB-DU plane may further include an RLC layer, a MAC layer, and a PHY layer. The communication between the CC-CU plane in the NB-CU plane and the CC-DU plane in the NB-DU plane may be performed using an F1-control (F1-C) interface. The communication between the layers corresponding to the CC-CU plane in the NB-CU plane and the layers corresponding to the layers in the CC-DU plane in the NB-DU plane may be performed using an F1-user (F1-U) interface. For example, the communication between the NB-CU plane and the NB-DU plane may be performed using control messages according to the F1AP (e.g., F1AP messages), and the control messages according to the F1AP may be mapped to higher layer messages (e.g., RRC message).

Also, the functional split according to an E1 application protocol (E1AP) may be applied to the protocol stack shown in FIG. 6. The protocol stack to which the functional split according to the F1AP/E1AP is applied may be as follows.

Figure 7:
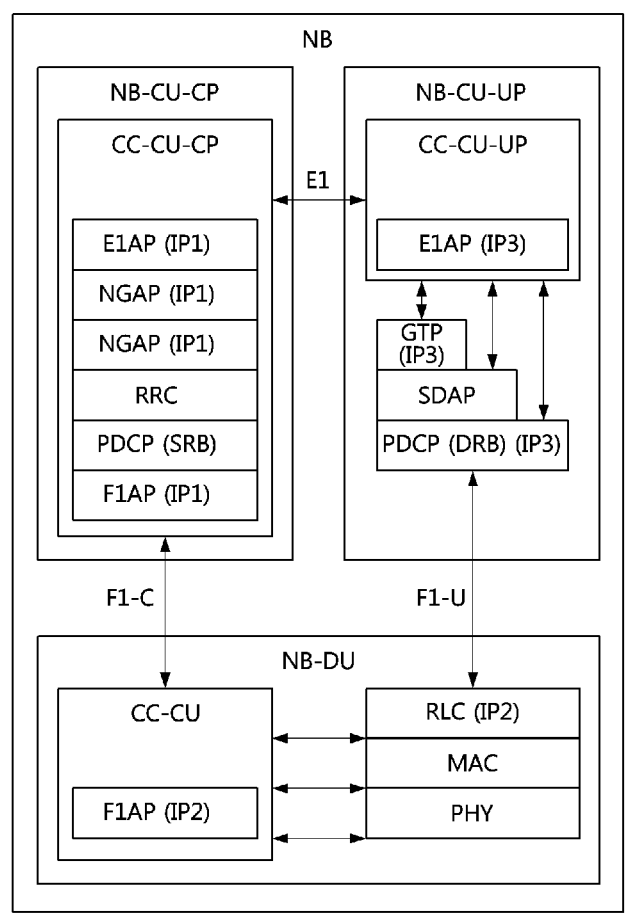
FIG. 7 is a block diagram illustrating a third embodiment of a protocol stack of a base station in a communication system.

FIG. 7 is a block diagram illustrating a third embodiment of a protocol stack of a base station in a communication system.

Referring to FIG. 7, a base station NB may be the base station 110-1, 110-2, 110-3, 120-1, or 120-2 shown in FIG. 1, and may be configured to be the same as or similar to the communication node 200 shown in FIG. 2. The base station NB may include an NB-CU-control plane (NB-CU-CP), an NB-CU-user plane (NB-CU-UP), and an NB-DU plane. That is, when the functional split according to E1AP is applied to the protocol stack shown in FIG. 6, the NB-CU plane may be split into the NB-CU-CP and the NB-CU-UP.

The NB-CU-CP may support a higher control protocol and may include the CC-CU-CP. The CC-CU-CP may include an E1AP layer, an NGAP layer, an RRC layer, a PDCP layer, and an F1AP layer. The PDCP layer included in the CC-CU-CP may provide SRB-related functions. The NB-CU-UP may support a protocol for data processing. The NB-CU-UP may include a CC-CU-UP, a GTP layer, an SDAP layer, and a PDCP layer. The CC-CU-UP layer may include an E1AP layer. The PDCP layer included in the NB-CU-UP may perform DRB-related functions. The communication between the NB-CU-CP and the NB-CU-UP may be performed using an E1 interface. That is, the communication between the NB-CU-CP and the NB-CU-UP may be performed using control messages according to the E1AP (e.g., E1AP messages).

The NB-DU plane may include the CC-DU plane and layers corresponding to the CC-DU plane. The CC-DU plane may include an F1AP layer. Also, the NB-DU plane may further include an RLC layer, a MAC layer, and a PHY layer. The communication between the NB-CU-CP and the CC-DU plane in the NB-DU plane may be performed using the F1-C interface. The communication between the NB-CU-UP and the layers corresponding to the CC-DU plane in the NB-DU plane may be performed using the F1-U interface.

The bearer establishment procedure performed by the base station having the protocol stack to which the F1AP/E1AP is applied may be as follows.

Figure 8:
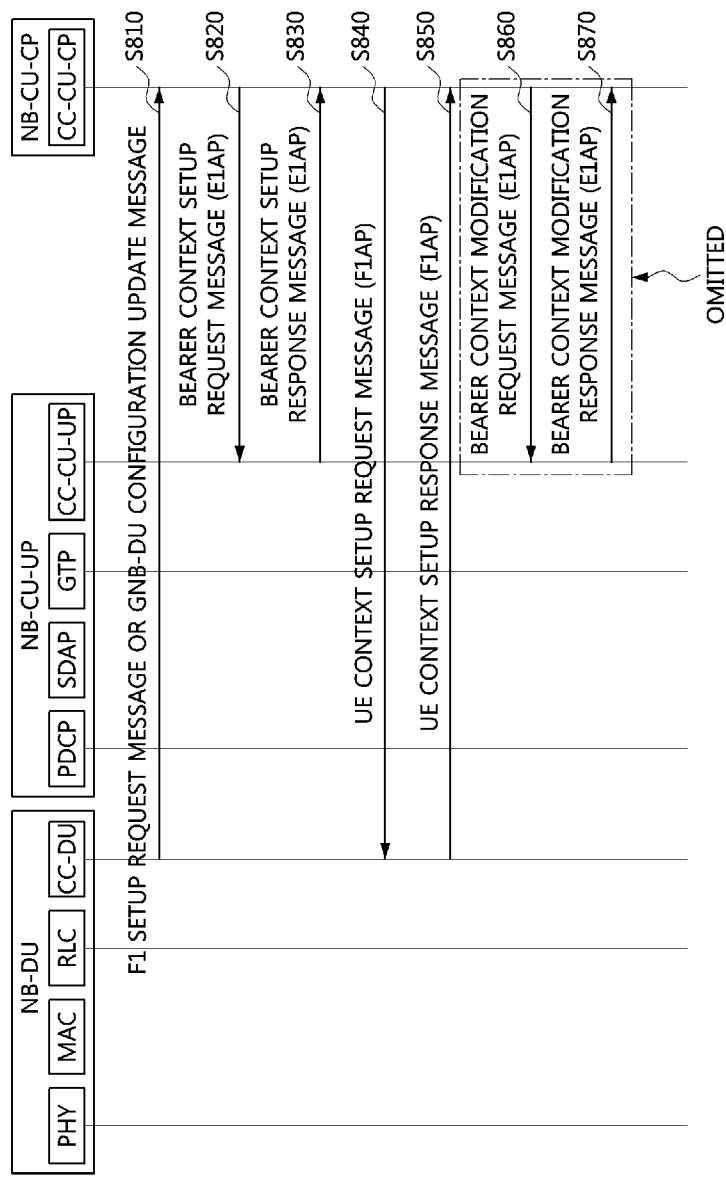
FIG. 8 is a sequence chart illustrating a first embodiment of a bearer establishment method in a communication system.

FIG. 8 is a sequence chart illustrating a first embodiment of a bearer establishment method in a communication system.

Referring to FIG. 8, a base station NB may be the base station 110-1, 110-2, 110-3, 120-1, or 120-2 shown in FIG. 1, and may be configured to be the same as or similar to the communication node 200 shown in FIG. 2. The protocol stack of the base station may be the same as or similar to the protocol stack shown in FIG. 7. For example, the base station may include an NB-CU-CP, an NB-CU-UP, and an NB-DU plane. The NB-CU-CP and the NB-CU-UP may be included in the NB-CU plane. The NB-CU-CP may include a CC-CU-CP, and the NB-CU-UP may include a CC-CU-UP, a GTP layer, an SDAP layer, and a PDCP layer. The NB-DU plane may include a CC-DU plane, an RLC layer, a MAC layer, and a PHY layer. In the following embodiments, each of the NB-CU plane, the NB-DU plane, the NB-CU-CP, the NB-CU-UP, the CC-CU-CP, the CC-CU-UP, the GTP layer, the SDAP layer, the PDCP layer, the CC-DU plane, the RLC layer, the MAC layer, and the PHY layer may mean a node performing the corresponding functions.

The communication between the NB-CU-UP and the NB-DU plane (e.g., transmission and reception of user data) may be performed using a GTP tunnel. The GTP tunnel may be defined between two nodes, and GTP tunnel information may include an internet protocol (IP) address and a tunnel endpoint identifier (TEID). The TEID may be configured by a receiving node and the receiving node may transmit a control message including the TEID to a peer communication node.

In this case, the NB-CU-UP may not know the GTP tunnel information of the NB-DU plane at the end of a transmission and reception procedure of a bearer context setup request/ response message. Therefore, the NB-CU-CP may obtain the GTP tunnel information of the NB-DU plane through a transmission and reception procedure of a UE context setup request/response message, and transmit the GTP tunnel information of the NB-DU plane to the NB-CU-UP by using a bearer context modification request message.

Meanwhile, the GTP tunnel information of the NB-DU plane may be transmitted to the NB-CU-CP before the transmission and reception procedure of the bearer context setup request/response message is performed. For example, the NB-DU plane may generate an F1 setup request message or a GNB-DU configuration update message including the GTP tunnel information. The GTP tunnel information included in the F1 setup request message or the GNB-DU configuration update message may include information elements shown in Table 6 below. The F1 setup request message or the GNB-DU configuration update message may include a plurality of GTP tunnel information, and the TEID included in the GTP tunnel information may be expressed by a range of TEIDs used in the NB-DU plane.

TABLE 6

| Information element | Description |
| --- | --- |
| TEID | Tunnel identifier used for reception in the NB-DU plane |
| IP address | IP address of the NB-DU plane |

The NB-DU plane may transmit the F1 setup request message or the GNB-DU configuration update message including the GTP tunnel information to the NB-CU-CP (S810). The F1 setup request message may be used to configure a logical connection (e.g., F1-C interface, F1-U interface) between the NB-DU plane and the NB-CU plane. The GNB-DU configuration update message may be used to inform the NB-CU plane of changes in the NB-DU plane.

The NB-CU-CP may receive the F1 setup request message or the GNB-DU configuration update message from the NB-DU plane, and may identify the GTP tunnel information of the NB-DU plane included in the F1 setup request message or the GNB-DU configuration update message.

The NB-CU-CP may generate a bearer context setup request message including the GTP tunnel information obtained through the F1 setup request message or the GNB-DU configuration update message. For example, downlink (DL) bearer information (e.g., DLBearerInfo) included in the bearer context setup request message may include the TEID and the IP address defined in Table 6. The NB-CU-CP may transmit the bearer context setup request message to the NB-CU-UP (S820). The NB-CU-UP may receive the bearer context setup request message from the NB-CU-CP, and identify the GTP tunnel information of the NB-DU plane included in the bearer context setup request message.

The NB-CU-UP may generate a bearer context setup response message in response to the bearer context setup request message, and may transmit the bearer context setup response message to the NB-CU-CP (S830). The NB-CU-CP may receive the bearer context setup response messages from the NB-CU-UP. Each of the bearer context setup request message and the bearer context setup response message may be a control message according to the E1AP.

On the other hand, the GTP tunnel information of the NB-DU plane may be transmitted through a UE context setup request message instead of the bearer context setup request message. For example, the NB-CU-CP may generate a UE context setup request message including the GTP tunnel information obtained through the F1 setup request message or the GNB-DU configuration update message. For example, received bearer information (e.g., RecvBearerInfo) included in the UE context setup request message may include the TEID and the IP address defined in Table 6. The NB-CU-CP may transmit the UE context setup request message to the NB-DU plane (S840). The UE context setup request message is transmitted to the NB-DU plane through the NB-CU-UP, so that the NB-CU-UP may obtain the GTP tunnel information of the NB-DU plane included in the UE context setup request message.

The NB-DU plane may receive the UE context setup request message from the NB-CU-CP, and may transmit a UE context setup response message to the NB-CU-CP in response to the UE context setup request message S850). The NB-CU-CP may receive the UE context setup response message from the NB-DU plane. Each of the UE context setup request message and the UE context setup response message may be a control message according to the F1AP.

Therefore, the transmission and reception procedures (S860 to S870) of the bearer context modification request/response message performed to inform the NB-CU-CP of the GTP tunnel information of the NB-DU plane may be omitted.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:
1. An operation method of a base station in a communication system, the operation method comprising:
  transmitting, to a user equipment (UE), a security mode command message including information requesting reporting of capability information and security configuration information;
  receiving, from the UE, a security mode complete message including the capability information requested by the security mode command message; and
  establishing a bearer for the UE,
  wherein when the base station includes a first node performing a control plane (NB-CU-CP) function, a second node performing a user plane (NB-CU-UP) function, and a third node performing a NB-DU function, in the establishing of the bearer, the third node transmits to the first node a first message including general packet radio service (GPRS) tunneling protocol (GTP) tunnel information.

2. The operation method according to claim 1, wherein each of the security mode command message and the security mode complete message is a radio resource control (RRC) message.

3. The operation method according to claim 1, wherein the security configuration information indicates a ciphering algorithm and an integrity protection algorithm used in communication between the UE and the base station.

4. The operation method according to claim 1, wherein the security mode command message requests reporting of capability information for one or more radio access technologies (RATs), and the security mode complete message includes the capability information for the one or more RATs.

5. The operation method according to claim 1, wherein the GTP tunnel information includes a tunnel endpoint identifier (TEID) and an internet protocol (IP) address for the third node.

6. The operation method according to claim 1, wherein the first message is an F1 setup request message or a GNB-DU configuration update message.

7. The operation method according to claim 1, wherein communication between the first node and the second node is performed using a control message according to an E1 application protocol (E1AP), communication between the first node and the third node is performed using a control message according to an F1 application protocol (F1AP), and communication between the second node and the third node is performed using a control message according to the F1AP.

8. The operation method according to claim 1, wherein the establishing of the bearer further comprises transmitting, by the first node, a bearer context setup request message including the GTP tunnel information to the second node.

9. The operation method according to claim 1, wherein the establishing of the bearer further comprises transmitting, by the first node, a UE context setup request message including the GTP tunnel information to the third node through the second node.

* * * * *